US006434601B1

(12) United States Patent
Rollins

(10) Patent No.: US 6,434,601 B1
(45) Date of Patent: Aug. 13, 2002

(54) PRE TEST ELECTRONIC MAIL PROCESS

(75) Inventor: Doug Rollins, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/281,935

(22) Filed: Mar. 31, 1999

(51) Int. Cl.[7] .............................................. G06F 15/16
(52) U.S. Cl. ...................................... 709/206; 709/232
(58) Field of Search ..................... 379/93.24; 455/566; 709/206, 214, 219, 237, 232

(56) References Cited

U.S. PATENT DOCUMENTS

| | | | |
|---|---|---|---|
| 5,752,059 A | 5/1998 | Holleran et al. ............ 709/245 |
| 5,765,033 A | 6/1998 | Miloslavsky ................ 709/206 |
| 5,806,005 A | * 9/1998 | Hull et al. ................... 455/566 |
| 5,826,022 A | 10/1998 | Nielsen ....................... 709/206 |
| 5,826,269 A | 10/1998 | Hussey ........................ 707/10 |
| 5,832,218 A | 11/1998 | Gibbs et al. ................ 709/203 |
| 5,870,548 A | 2/1999 | Nielsen ....................... 709/206 |
| 5,923,848 A | * 7/1999 | Goodhand et al. .......... 709/219 |
| 6,163,809 A | * 12/2000 | Buckley ...................... 709/237 |
| 6,167,435 A | * 12/2000 | Druckenmiller et al. .... 709/206 |
| 6,202,087 B1 | * 3/2001 | Gadish ........................ 709/206 |
| 6,212,553 B1 | * 4/2001 | Lee et al. .................... 709/206 |

OTHER PUBLICATIONS

Kathy Sexton, Forwarding E-mail Between Accounts, University of Notre Dame, Office of Information Technologies, Nov. 12, 1996.

* cited by examiner

*Primary Examiner*—N. Le
*Assistant Examiner*—Walter Benson
(74) *Attorney, Agent, or Firm*—Perkins Coie LLP

(57) ABSTRACT

The present invention provides a method and apparatus which operates completely in the background (i.e., transparent to the user) to verify the validity of an addressee's Internet e-mail address. The invention seeks to prevent the delivery of an e-mail message having an incorrect user name, server name, or a misspelling in either or both in the addressee's Internet e-mail address. If an error is detected, it is called to the sender's attention, where it may be corrected before the message is sent.

65 Claims, 3 Drawing Sheets

PRE TEST ELECTRONIC MAIL PROCESS

BACKGROUND OF THE INVENTION

1. Field of the Invention

The present invention relates generally to electronic mail (e-mail); more specifically, the present invention relates to a method of verifying the accuracy of an e-mail address and, hence, the deliverability of the e-mail message, as the e-mail message is being created.

2. Description of the Related Art

Computer systems are well known in the art and have become a staple both in the modern workplace as well as in many homes. Current technology has made possible the transmission and receipt of digital data between a plurality of such computer systems. That is, numerous independent and separate personal computers and workstations can be interconnected by transmission lines which are used to conduct bits of digital data between the connected devices, thereby forming a computer network.

Computer networks are becoming increasingly popular as they allow end users to communicate and share ideas with each other, as well as share files, application programs, and peripheral hardware. One additional feature available to end users connected to such computer networks is e-mail for sending and receiving messages to other end users connected to the network.

E-mail provides a quick and convenient way for computer users to communicate. This communication is initiated by a message sender composing a message using text (and optionally including other data) and addressing the message to a recipient at a different computer.

An e-mail message, especially one following the common RFC 822 standard (i.e., "Request For Comments" 822 defining the standard format for Internet e-mail), begins with several line of headers, followed by a blank line, and the body of the message. Additionally, an increasing number of e-mail systems support the standard for multipurpose Internet mail extensions (MIME). MIME provides the ability to electronically transfer non-textual data, such as graphics, audio and facsimile (i.e., attachments).

To compose an e-mail message, the sender often uses a special program—a mail user agent (MUA), such as, e.g., Microsoft's "Outlook" or "Exchange." The sender provides the e-mail address of the intended recipient, and often provides an indication of the content (subject matter) of the message by providing text in a "subject" field. The sender then types a message in the "message" field and sends the message on its way to the addressee.

The message is then passed to a message transfer agent (MTA) which is responsible for either delivering the message locally or passing it to another MTA. MTAs on different hosts on a network often communicate using simple mail transfer protocol (SMTP), which allows for the transfer of e-mail messages between servers. The message is then retrieved from the recipient's local server using a version of post office protocol (POP). The message is eventually delivered to the recipient's mailbox, from where he/she can read it using a mail reading program which may, or may not, be the same MUA as that used by the sender.

If the e-mail address provided to the e-mail software program is valid, the recipient's computer receives the message and stores it in the recipient's inbox using POP. The recipient will eventually read, delete, respond to, or otherwise process the message stored within the inbox.

As is well known in the art, a determining factor as to whether the recipient shall receive the e-mail message is the accuracy of the e-mail address. The e-mail address describes the destination location of the information to be sent. On occasion, it may also include some routing information. It is analogous to the addresses used in mailing a letter via the postal service. When mailing a letter, the post office needs to know for whom the letter is intended, the number and street, and the city, state, zip code, and country of the recipient. Likewise, when sending a message through a computer network, the sender needs to designate the electronic destination of the information to be sent.

For small networks having relatively few users and computers, e-mail addresses are specified in a relatively simple and straightforward manner. However, as computer networks have become more complex (e.g., with the introduction of repeaters, for copying and forwarding digital data from one network to another; bridges, for interfacing between networks employing differing protocols; and routers, for connecting networks having differing topologies), so to have e-mail addresses.

Addresses for different types of e-mail systems often require different syntaxes for specifying the necessary information. A syntax specifies how the pieces of information comprising the e-mail address are to be expressed. If a user inadvertently departs from a given syntax utilized by that particular e-mail system, the e-mail message will not reach its intended destination. For example, a careless error such as specifying a mail server which does not exist, or misspelling the addressee's name in the message header, will prevent the e-mail message from reaching its intended recipient. Thus, it is clear that the accuracy with which the user enters the e-mail address is of paramount importance.

Unfortunately, it is not uncommon in today's hectic workplace for an error to be made with regard to entering an intended recipient's e-mail address. Such careless errors invariably result in the e-mail message not reaching the intended recipient. Furthermore, it is often the case that the author of such an ill-fated e-mail does not become aware of his/her mistake until some significant amount of time has lapsed.

That is, by the time the sender receives an error message with regard to the ill-fated e-mail message, it is not uncommon for several hours, or even days, to have lapsed from the time the e-mail message was originally sent. Incidentally, this scenario fails to take into account the author's time spent in preparing the original e-mail message, which may be quite substantial.

E-mail has become such a relied upon means of communication in the modem-day workplace that delays such as those described above can conceivably affect a company's profitability; this holds especially true for today's small business driven market. By the time the e-mail sender finally receives notification that the intended recipient's e-mail address was incorrect, it is very likely that the subject matter of the message is no longer of use to either party inasmuch as the decisions which would have been affected by the ill-fated e-mail message have now been reached.

E-mail products such as Microsoft's "Outlook" or "Exchange" do offer a partial solution to the above described problem by verifying the existence of the addressee before the message is sent. However, these products are effective only to the extent that the addressee is already known to the local server. If the addressee is not local, that is, if the addressee has an Internet e-mail address, these products are capable only of examining the format of the address. If the address meets the familiar format, "addressee@host.extension," it is assumed by the product to be a valid address, and the e-mail is presumed to be deliverable. Unfortunately, there currently does not exist an e-mail product that verifies the validity of an addressee's e-mail address before the message is sent, and which also operates in the background of a client system without distraction to the user.

SUMMARY OF THE INVENTION

The present invention provides a method and apparatus which operates completely in the background (i.e., transparent to the user) to verify the validity of an addressee's Internet e-mail address. The invention seeks to prevent the delivery of an e-mail message having an incorrect user name, server name, or a misspelling in either or both in the addressee's Internet e-mail address.

The present invention calls the addressing error to the sender's attention, where it may be corrected before the message is sent, thereby eliminating the potential of losing hours, perhaps days, before the addressing error is discovered. The invention, which operates using standard SMTP/POP protocols, may be easily incorporated within existing e-mail software programs.

BRIEF DESCRIPTION OF THE DRAWINGS

These and other advantages and features of the invention will be more clearly understood from the following detailed description of the invention which is provided in connection with the accompanying drawings in which.

DETAILED DESCRIPTION OF PREFERRED EMBODIMENT

A preferred embodiment of the present invention will now be described with reference to FIGS. 1–3. Other embodiments may be realized and structural, logical, or programming changes may be made to the disclosed embodiment without departing from the spirit or scope of the present invention.

Figure 1:
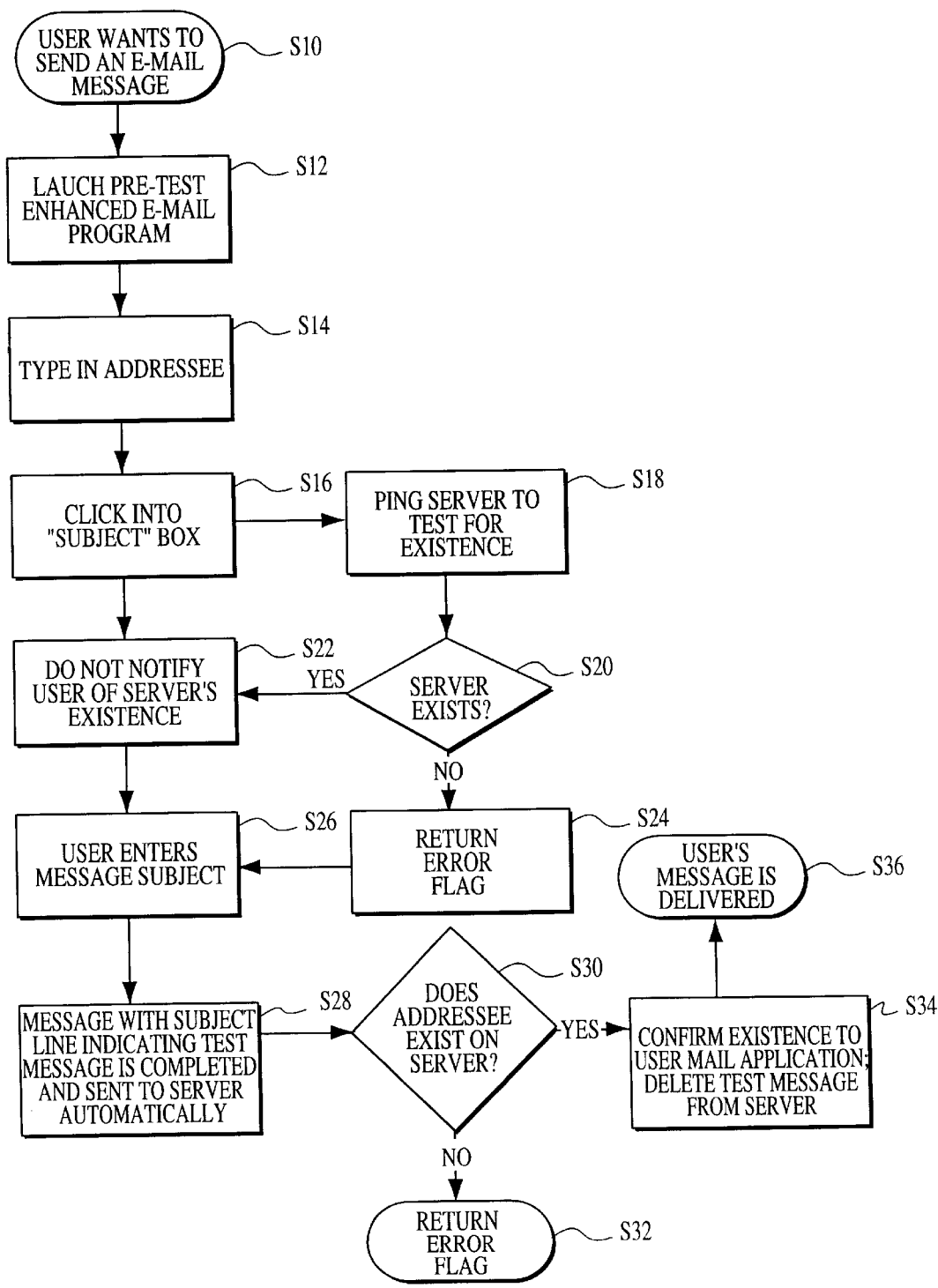
FIG. 1 illustrates a flow chart which describes the e-mail pre test method of the invention.

FIG. 1 illustrates a flow chart depicting the e-mail pre test method of the invention. At step S10, the user decides to send an e-mail message. The user then launches an e-mail program, at step S12; the e-mail program running an e-mail pre test such as that of the present invention. Next, the user types the addressee's e-mail address in the "To" field at step S14. At step S16, the user positions the cursor into the "subject" field, which initializes the operation of the present invention.

Immediately upon detecting that the cursor is within the "subject" field, the e-mail program executes a ping to the specified mail server at step S18. As is known in the art, a ping (Packet INternet Groper) is a small message sent from a first computer to a second computer for checking: i) the presence of the second computer; ii) the integrity of the connection between the two computers; and iii) the alertness of the second computer. The next step is to determine whether the intended recipient's mail server, as specified by the user, exists at step S20.

When the computer receiving the ping is a network mail server (e.g., such as "host" in the typical Internet e-mail address described above), it is very likely configured to respond to such pings in a manner which is similar to that of a sonar pulse being returned to the sending party. If the specified mail server does respond to the ping, it is an affirmative response which signals to the user's e-mail program the existence of the recipient's mail server (e.g., "host"), at step S22. In the case of such an affirmative response, the user is not notified (i.e., the pre test operates completely in the background).

If the specified mail server does not respond to the ping (i.e., if the ping "times out" without a response), it likely means that there is an error with the mail server portion of the specified e-mail address (i.e., an error in the way in which it was typed into the "To" field of the user's e-mail program). If such is the case, the program will return an error message at step S24. The error message will inform the user of the unknown host, giving the user an opportunity to correct the fatal error before the message is futilely sent. It should be noted that regardless of whether the response is affirmative or negative, the user's e-mail program will very likely have received the response while the user is still typing in the "subject" field.

Next, the user moves the cursor to the "message" field of the e-mail program at step S26. Immediately upon detecting that the cursor is in the "message" field, the e-mail pre test method of the invention generates a small test message, at step S28, to be sent to the same mail server as the user has listed in the "To" field of the mail form. The difference between the first ping, at step S18, and this small test message, at step S28, is that unlike the first ping which verified the existence of only the addressee's mail server, the small test message verifies the existence of the addressee as a user on the recipient's mail server.

Furthermore, the small test message is automatically sent to the addressee's mail server as the user types the message. Since typing the message may take anywhere from thirty seconds to many minutes to complete, the user's e-mail program is almost certain to have both: i) generated and transmitted the small test message to the addressee's mail server; and ii) received a response from the addressee's mail server confirming the existence, or non-existence, of the named addressee by the time the message is completed and ready for transmission by the user.

Next, depending upon the response it receives from the addressee's mail server, the present invention determines whether the addressee does exists as a user on the addressee's mail server at step S30. The addressee's mail server, having standard configuration, will respond to the small test message in either the affirmative or the negative. If the response is in the negative, the user's e-mail program generates an error message, at step S32, prompting the user to check the accuracy of the username (e.g., spelling, etc.) which is currently in the "To" field with a valid host name.

If the response from the addressee's mail server is in the affirmative (i.e., the username exists on the addressee's mail server), the addressee's mail server responds to the small test message with a message header, thereby confirming receipt of the small test message to the user's e-mail program at step S34. Once the addressee's mail server has responded to the small test message, the addressee's server may automatically delete the test message, at step S34, without the intended recipient (i.e., the addressee) being aware that a test message was ever transmitted. It should be noted, however, that in order for the addressee's server to delete the test message after it has responded to it, the server must be specially configured to do so. Additionally, both the original small test message, and the addressee mail server's response, are automatically deleted by the user's e-mail program at step S34. At step S36, the user's message is sent to the addressee with an extremely high probability that the addressee will, in fact, receive the message.

It should be noted that in the event the user sends his/her message (i.e., clicks on "send" button) with an addressing error before the pre test enhanced e-mail software program has completed the above-described e-mail address verification, the user will simply receive the standard "fatal error" message as is currently the practice in the art.

In the alternative, the e-mail pre test process of the invention may be configured to prevent an e-mail message from being sent prematurely. That is, no message may be sent before an Internet e-mail address verification has been performed. This would be achieved by having the e-mail pre test process configured to prevent or "block" any message from being sent if an error has been found to exist in an addressee's Internet e-mail address.

Figure 2:
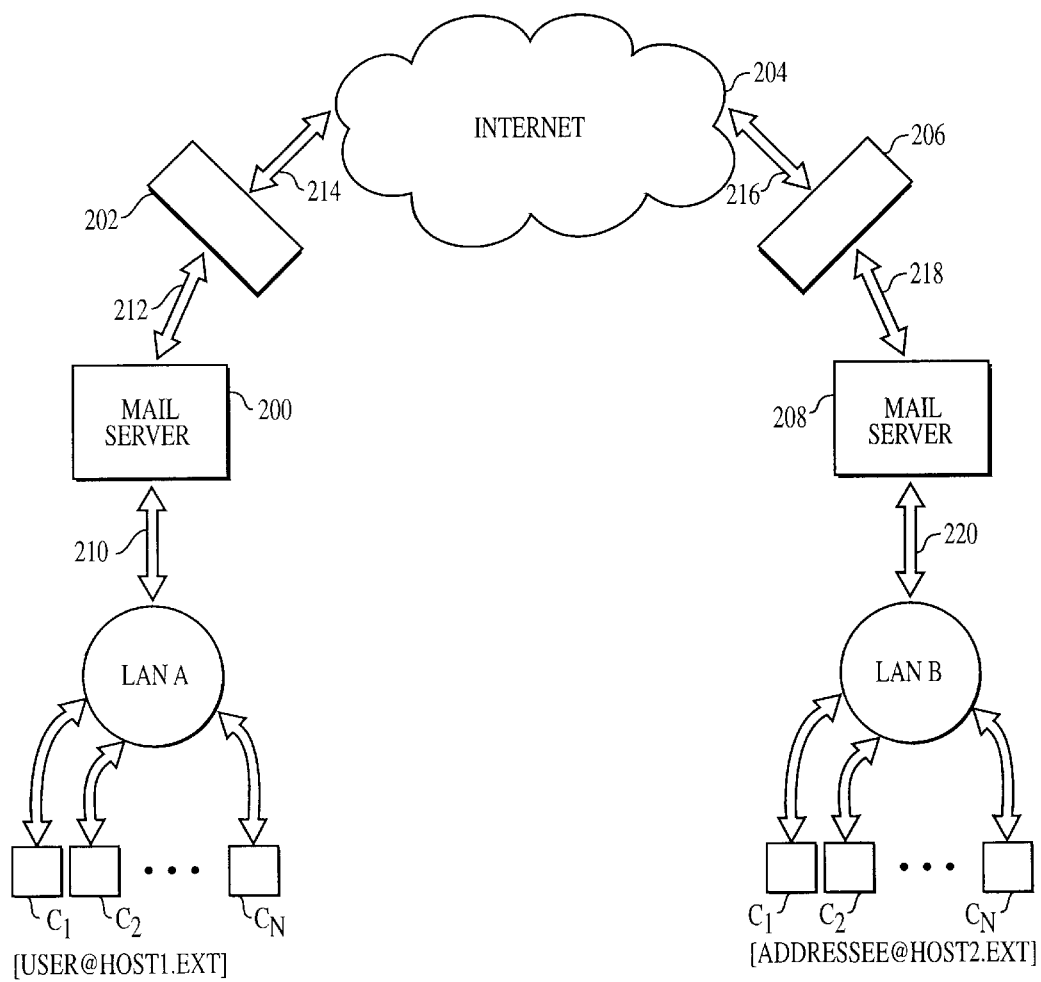
FIG. 2 illustrates an e-mail delivery system upon which a method of the invention may be employed.

Referring now to FIG. 2, a representative diagram of an e-mail delivery system is depicted upon which a method of the invention may be employed. A first local area network LAN A couples together several client users $C_1, C_2, \ldots C_N$, where N may be any number of client users. For purposes of this specification, we are assuming that a user of LAN A client $C_1$ is sending an e-mail message to a user of LAN B client $C_2$. Additionally, we are assigning arbitrary e-mail address "user@host1.ext" to LAN A client $C_1$ ($C_1$) and arbitrary e-mail address "addressee@host2.ext" to LAN B client $C_2$ ($C_2$).

First, the $C_1$ user launches an e-mail program enhanced with a pre test method of the invention. The user of $C_1$ then types the addressee's $C_2$ e-mail address into the "To" field of the e-mail form. Next, as $C_1$'s user places the cursor into the "subject" field, the pre test enhanced e-mail program executes a ping to mail server 208 (i.e., "host2"). That is, the ping travels from $C_1$ to mail server 200, via communication link 210. The ping then travels through a network of routers and switches 202, via communication link 212. Next, the ping reaches the Internet 204, via communication link 214. The ping then travels through a network of switches and routers 206, via communication link 216, and reaches its final destination, mail server 208, via communication link 218.

Next, server 208 affirmatively responds to $C_1$ that it has received the ping. The server's response follows a path back to $C_1$ which is substantially a reverse path of that traveled by the ping. However, as it is known in the art, the specific path selected by Internet routers and switches in transmitting an e-mail message is dependent upon several different factors, one of which is the number of e-mail messages being transmitted at a particular time. Inasmuch as the ping's trip, from $C_1$ to server 208, and the server's 208 response take little more than a few seconds to complete, the pre test enhanced e-mail program is capable of verifying the existence of server 208 (i.e., "host2") while the user of $C_1$ is still typing in the "subject" field of his e-mail form. Thus, if $C_1$ does not generate an error message for the user, the user may complete his message confident in the fact that he has specified a valid host destination for his e-mail message. That is, the operation of sending the ping from $C_1$ to the server 208 was entirely a background operation without the user being aware of its occurrence. If, however, the server 208 does not exist as written (e.g., a typographical error exists in the addressee's e-mail address) $C_1$ will notify its user of that fact, giving the user an opportunity to correct the error before sending the message.

Next, as $C_1$'s user places the cursor into the "message" field, in preparation for typing message text, the pre test enhanced e-mail program generates a small test message. $C_1$ sends the test message, specially identified as such, to the addressee's server 208 (which $C_1$ has already verified does exist) so that the server 208 can verify whether the addressee $C_2$ (i.e., the "addressee" portion of the e-mail address) exists as a client on server 208. The test message, similar to the ping, travels from $C_1$ to server 208, via the same route as previously described for the ping.

Upon receiving the small test message, server 208, having standard configuration, responds either in the affirmative or the negative, in similar fashion to its response of the ping. That is, once the server 208 identifies the incoming message as a test message, the server 208 verifies the existence of the "addressee" as a user on the server 208 ("host2"). Server 208 performs this verification via communication link 220 by inspecting whether a user having "addressee" as a username exists as a client $C_2$ on the server 208. If $C_1$ has provided a correct e-mail address for $C_2$, server 208 responds in the affirmative in similar fashion to its response of the ping (i.e., the response to the test message follows a path back to $C_1$ which is substantially a reverse path of that traveled by the ping, subject of course to specific "routing" decisions made by the switches and routers), and, similar to the server's response to the ping, the test message response is completely transparent to the user of $C_1$.

If, however, $C_1$'s user has typed in an incorrect addressee (i.e., on the now verified existing server 208), server 208 responds to the test message in the negative. That is, the server's 208 response to $C_1$ indicates that the addressee (as typed) does not exist as a user on server 208. The negative response to the test message follows a path back to $C_1$ which is substantially the same as a path followed by the server's 208 response to the ping. Upon receiving the negative response from server 208, $C_1$ then notifies the user of the e-mail program that there is an error with the address as typed in the "To" field, prompting the user to correct the error before the actual message is sent in vain.

Figure 3:
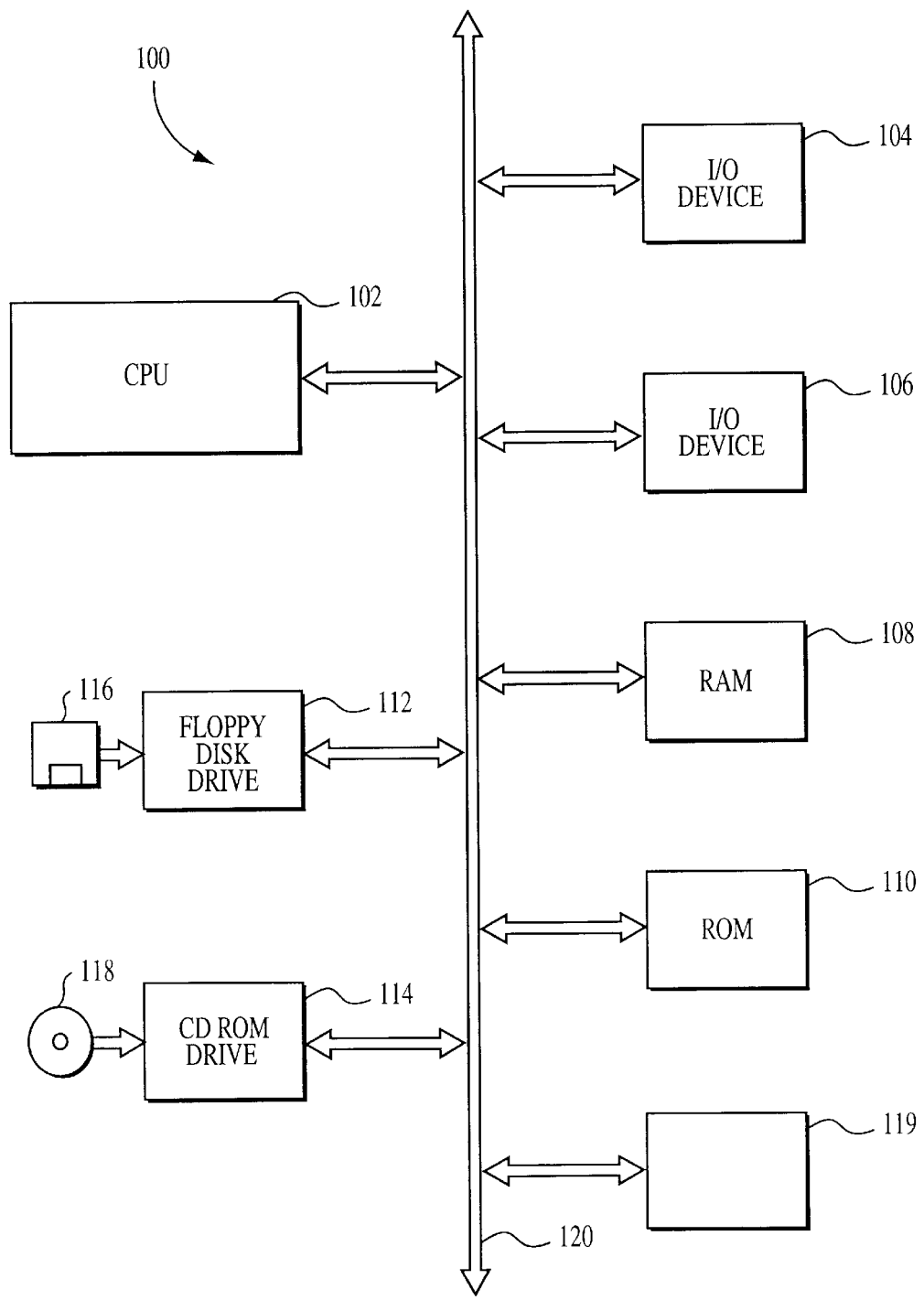
FIG. 3 illustrates a processor based system which incorporates the e-mail pre test method of the invention.

FIG. 3 illustrates a simplified processor-based system 100, including conventional I/O devices 104, 106, e.g., keyboard, display, computer mouse, etc. The processor-based system 100 includes a central processing unit (CPU) 102, e.g., a microprocessor, that communicates with I/O devices 104, 106 over a bus 120. The processor-based system 100 also includes random access memory (RAM) 108, read only memory (ROM) 110 and peripheral devices, such as, e.g., a floppy disk drive 112, and a compact disk (CD) drive 114, which also communicate with the CPU 102 over the bus 120 as is well known in the art.

Also included within the processor-based system 100 may be at least one portable data storage medium. The portable data storage medium contains an e-mail software program containing software code enabling the processor-based system 100 to perform an e-mail pre test process in accordance with the present invention.

The portable data storage medium, storing an e-mail program as described above, may be in the form of, e.g., a floppy disk 116 which transfers its data to the CPU 102 via floppy disk drive 112 and bus 120, or a compact disk 118 which transfers its data to the CPU 102 via CD ROM drive 114 and bus 120.

Also included within the processor-based system 100 may be a stationary data storage device 119, which transfers its data to CPU 102 over bus 120, and which may contain an e-mail software program containing software code enabling the processor-based system 100 to perform an e-mail pre test process in accordance with the present invention. The stationary storage device may be in the form of a hard disk.

It must be noted that the present invention is implemented as a program which gets executed on a computer system. The invention can be written in different computer languages for different computer systems. The present invention can be stored on a hard drive, floppy disk, CD-ROM or other permanent or semi-permanent storage medium. The program embodying the present invention can also be downloaded, for example from a server computer, or the Internet, or transmitted as a data signal over a communications path, e.g., over the Internet or on a transmitted carrier wave, as is known in the art.

It should also be mentioned that although only one intended recipient is depicted within FIGS. 1 and 2 for purposes of simplicity, the present invention is capable of assessing the validity of multiple Internet e-mail addresses. If there are more than one e-mail address having a common destination host, the invention pings that common host in a manner which is identical to that described in FIGS. 1 and 2. If, however, there are at least two e-mail addresses having different hosts (e.g., "addressee1@host1.ext" and "addressee2@host2.ext"), the invention pings the hosts in a serial manner starting with the first address listed within the "To" field.

The present invention provides a client based Internet e-mail address verification process which operates completely within the background, with respect to the user. The first step, the execution of a ping, serves as an extremely quick way to test for the existence, and alertness of an addressee's mail server. After the existence of the mail server is verified, the next step is to test for the existence of the addressee as a user on the previously tested mail server. The present invention provides a quick and effortless way to ensure that virtually every e-mail message sent will reach its intended destination.

While a preferred embodiment of the invention has been described and illustrated, it should be apparent that many modifications can be made to the invention without departing from its spirit or scope. Accordingly, the invention is not limited by the foregoing description or drawings, but is only limited by the scope of the appended claims.

What is claimed as new and desired to be protected by Letters Patent of the United States is:

1. A method of sending an electronic mail (e-mail) message, the method comprising:
   receiving as an input at least one e-mail address for at least one intended recipient of said e-mail message into an address accepting field of an e-mail software program;
   verifying whether said at least one entered e-mail address is valid and able to receive e-mail messages, said verification being performed by said e-mail software program sending a ping/test message prior to sending said e-mail message to said at least one intended recipient; and
   sending said e-mail message to said at least one intended recipient with said e-mail software program.

2. The method as in claim 1 further comprising preventing the sending of said e-mail message in the event said at least one entered e-mail address is invalid.

3. The method as in claim 1 further comprising preventing the sending of said e-mail message prior to completion of said act of verifying.

4. The method as in claim 1 further comprising:
   identifying a host server for said at least one intended recipient prior to sending said e-mail message to said at least one intended recipient; and
   verifying the existence of said host server prior to sending said e-mail message.

5. The method as in claim 1 further comprising:
   identifying a host server for said at least one intended recipient prior to sending said e-mail message to said at least one intended recipient;
   executing a ping with said e-mail software program to said host server; and
   receiving a response from said host server before sending said e-mail message, said response providing verification of the existence of said host server.

6. The method as in claim 5, wherein said act of executing is transparent to a user of said e-mail software program.

7. The method as in claim 6, wherein said act of executing occurs only after a user of said e-mail software program positions a cursor into a subject accepting field of said e-mail software program.

8. The method as in claim 5 wherein receiving the response comprises receiving an affirmative response from said host server, said affirmative response verifying the existence of said host server.

9. The method as in claim 1 further comprising:
   identifying a host server for said at least one intended recipient prior to sending said e-mail message to said at least one intended recipient;
   executing a ping with said e-mail software program to said host server;
   receiving no response from said host server; and
   notifying a user of said e-mail software program that an error exists in said at least one e-mail address.

10. The method as in claim 4 further comprising:
    identifying a username for said at least one intended recipient prior to sending said e-mail message to said at least one intended recipient; and
    verifying status of said at least one username as a valid client on said host server.

11. The method as in claim 4 further comprising:
    identifying a username for said at least one intended recipient prior to sending said e-mail message to said at least one intended recipient;
    sending a message with said e-mail software program to said host server; and
    receiving a test response from said host server before sending said e-mail message, said test response providing verification of the status of said at least one username as a valid client on said host server.

12. The method as in claim 11, wherein said act of sending is transparent to a user of said e-mail software program.

13. The method as in claim 12, wherein said act of sending occurs only after a user of said e-mail software program positions a cursor into a message accepting field of said e-mail software program.

14. The method as in claim 11 wherein receiving the test response comprises receiving a confirmation of test message delivery from said host server, said confirmation serving to confirm status of said at least one username as a valid client on said host server.

15. The method as in claim 4 further comprising:
    identifying a username for said at least one intended recipient prior to sending said e-mail message to said at least one intended recipient;
    sending a test message with said e-mail software program to said host server;

receiving a negative response from said host server; and in response to receipt of said negative response, notifying a user of said e-mail software program that an error exists in said at least one e-mail address.

16. A system for sending an electronic mail (e-mail) message, the system comprising:

a processor-based device capable of running an e-mail software program;

said e-mail software program being capable of sending a ping/test message to verify whether an e-mail address entered into an e-mail address accepting field of said software program is valid and able to receive e-mail messages; and said e-mail software program being capable of performing said verification prior to sending said e-mail message to an intended recipient.

17. The system as in claim 16, wherein said e-mail software program running on said processor-based device is capable of preventing the sending of said e-mail message in the event said e-mail address is invalid.

18. The system as in claim 16, wherein said e-mail software program running on said processor-based device is capable of preventing the sending of said e-mail message prior to performing said verification.

19. The system as in claim 16, wherein said e-mail software program running on said processor-based device is capable of verifying the existence of a host server for an intended recipient, said verification occurring prior to sending said e-mail message.

20. The system as claim 16, wherein said e-mail software program is capable of executing a ping to a host server for an intended recipient prior to sending said e-mail message.

21. The system as in claim 20, wherein said e-mail software program is capable of receiving a response from said server prior to sending said e-mail message, receipt of said response providing verification of the existence of said host server.

22. The system as in claim 20, wherein said e-mail software program is capable of executing said ping in a background of the operation of said e-mail program.

23. The system as in claim 21, wherein said e-mail software program is capable of determining that an error exists in said e-mail address upon receiving no response from said host server.

24. The system as in claim 23, wherein said e-mail software program is capable of notifying a user of said software program that said error exists.

25. The system as in claim 16, wherein said e-mail software program running on said processor-based device is capable of verifying the status of a username in said e-mail address as being a valid client on a host server for said intended recipient.

26. The system as in claim 16, wherein said e-mail software program is capable of sending a test message to a host server for an intended recipient prior to sending said e-mail message.

27. The system as in claim 26, wherein said e-mail software program is capable of receiving a response from said host server prior to sending said e-mail message, receipt of said response providing verification of the status of a username in said e-mail address as a valid client on said host server.

28. The system as in claim 26, wherein said e-mail software program is capable of sending said test message in a background of the operation of said e-mail program.

29. The system as in claim 27, wherein said e-mail software program is capable of determining that an error exists in said e-mail address upon receiving a negative response from said host server.

30. The system as in claim 29, wherein said e-mail software program is capable of notifying a user of said software program that said error exists.

31. A computer readable storage medium containing a computer readable code for operating a computer to perform a method of sending an electronic mail (e-mail) message, said method comprising:

receiving as an input at least one e-mail address for at least one intended recipient of said e-mail message into an address accepting field of an e-mail software program;

verifying whether said at least one entered e-mail address is valid and able to receive e-mail messages, said verification being performed by said e-mail software program sending a ping/test message prior to sending said e-mail message to said at least one intended recipient; and sending said e-mail message to said at least one intended recipient with said e-mail software program.

32. The computer readable storage medium of claim 31, wherein said method further comprises preventing the sending of said e-mail message in the event said at least one entered e-mail address is invalid.

33. The computer readable storage medium of claim 31, wherein said method further comprises preventing the sending of said e-mail message prior to completion of said method act of verifying.

34. The computer readable storage medium of claim 31, wherein said storage medium further comprises a portable storage medium.

35. The computer readable storage medium of claim 34, wherein said portable storage medium further comprises a floppy disk.

36. The computer readable storage medium of claim 34, wherein said portable storage medium further comprises a CD-ROM.

37. The computer readable storage medium of claim 31, wherein said storage medium further comprises a stationary storage medium stored within said computer.

38. The computer readable storage medium of claim 37, wherein said stationary storage medium further comprises a hard disk.

39. The computer readable storage medium of claim 31, wherein said method further comprises:

identifying a host server for said at least one intended recipient prior to sending said e-mail message to said at least one intended recipient; and verifying the existence of said host server prior to sending said e-mail message to said at least one intended recipient.

40. The computer readable storage medium of claim 31, wherein said method further comprises:

identifying a host server for said at least one intended recipient prior to sending said e-mail message to said at least one intended recipient;

executing a ping with said e-mail software program to said host server; and receiving a response from said host server before sending said e-mail message, said response providing verification of the existence of said host server.

41. The computer readable storage medium of claim 40, wherein said method act of executing is transparent to a user of said e-mail software program.

42. The computer readable storage medium of claim 41, wherein said method act of executing occurs only after a user of said e-mail software program positions a cursor into a subject accepting field of said e-mail software program.

43. The computer readable storage medium of claim 40, wherein said method act of receiving the response comprises receiving an affirmative response from said host server, said affirmative response verifying the existence of said host server.

44. The computer readable storage medium of claim 31, wherein said method further comprises:
identifying a host server for said at least one intended recipient prior to sending said e-mail message to said at least one intended recipient;
executing a ping with said e-mail software program to said host server;
receiving no response from said host server; and
notifying a user of said e-mail software program that an error exists in said at least one e-mail address.

45. The computer readable storage medium of claim 40, wherein said method further comprises:
identifying a username for said at least one intended recipient prior to sending said e-mail message to said at least one intended recipient; and
verifying status of said at least one username as a valid client on said host server.

46. The computer readable storage medium of claim 45, wherein said method further comprises:
identifying a username for said at least one intended recipient prior to sending said e-mail message to said at least one intended recipient;
sending a test message with said e-mail software program to said host server; and
receiving a test response from said host server before sending said e-mail message, said test response providing verification of the status of said at least one username as a valid client on said host server.

47. The computer readable storage medium of claim 46, wherein said act of sending is transparent to a user of said e-mail software program.

48. The computer readable storage medium of claim 47, wherein said act of sending occurs only after a user of said e-mail software program positions a cursor into a message accepting field of said e-mail software program.

49. The computer readable storage medium of claim 46, wherein receiving the test response comprises receiving a confirmation of test message delivery from said host server, said confirmation serving to confirm status of said at least one username as a valid client on said host server.

50. The computer readable storage medium of claim 46, wherein said method further comprises:
identifying a username for said at least one intended recipient prior to sending said e-mail message to said at least one intended recipient;
sending a test message with said e-mail software program to said host server;
receiving a negative response from said host server; and
notifying a user of said e-mail software program that an error exists in said at least one e-mail address.

51. A method of transmitting computer readable code comprising the act of transmitting said computer readable code over a communication path, said code being executable by a processor as an e-mail software program to carry out a method of sending an electronic mail (e-mail) message, said sending method comprising:
entering at least one e-mail address for at least one intended recipient of said e-mail message into an address accepting field of an e-mail software program;
verifying whether said at least one entered e-mail address is valid and able to receive e-mail messages, said verification being performed by said e-mail software program sending a ping/test message prior to sending said e-mail message to said at least one intended recipient; and
sending said e-mail message to said at least one intended recipient with said e-mail software program.

52. The method of claim 51, wherein said sending method further comprises preventing the sending of said e-mail message in the event said at least one entered e-mail address is invalid.

53. The method of claim 51, wherein said sending method further comprises preventing the sending of said e-mail message prior to completion of said method act of verifying.

54. The method of claim 51, wherein said sending method further comprises:
identifying a host server for said at least one intended recipient prior to sending said e-mail message to said at least one intended recipient; and
verifying the existence of said host server prior to sending said e-mail message to said at least one intended recipient.

55. The method of claim 51, wherein said sending method further comprises:
identifying a host server for said at least one intended recipient prior to sending said e-mail message to said at least one intended recipient;
executing a ping with said e-mail software program to said host server; and
receiving a response from said host server before sending said e-mail message, said response providing verification of the existence of said host server.

56. The method of claim 55, wherein said act of executing is transparent to a user of said e-mail software program.

57. The method of claim 56, wherein said act of executing occurs only after a user of said e-mail software program positions a cursor into a subject accepting field of said e-mail software program.

58. The method of claim 55, wherein receiving the response comprises receiving an affirmative response from said host server, said affirmative response verifying the existence of said host server.

59. The method of claim 51, wherein said sending method further comprises:
identifying a host server for said at least one intended recipient prior to sending said e-mail message to said at least one intended recipient;
executing a ping with said e-mail software program to said host server;
receiving no response from said host server; and
notifying a user of said e-mail software program that an error exists in said at least one e-mail address.

60. The method of claim 55, wherein said sending method further comprises:
identifying a username for said at least one intended recipient prior to sending said e-mail message to said at least one intended recipient; and
verifying status of said at least one username as a valid client on said host server.

61. The method of claim 55, wherein said sending method further comprises:
identifying a username for said at least one intended recipient prior to sending said e-mail message to said at least one intended recipient;

sending a test message with said e-mail software program to said host server; and receiving a test response from said host server before sending said e-mail message, said test response providing verification of the status of said at least one username as a valid client on said host server.

62. The method of claim 61, wherein said act of sending is transparent to a user of said e-mail software program.

63. The method of claim 62, wherein said act of sending occurs only after a user of said e-mail software program positions a cursor into a message accepting field of said e-mail software program.

64. The method of claim 61, wherein receiving the test response comprises receiving a confirmation of test message delivery from said host server, said confirmation serving to confirm status of said at least one username as a valid client on said host server.

65. The method of claim 55, wherein said sending method further comprises:

identifying a username for said at least one intended recipient prior to sending said e-mail message to said at least one intended recipient;

sending a test message with said e-mail software program to said host server;

receiving a negative response from said host server; and notifying a user of said e-mail software program that an error exists in said at least one e-mail address.

* * * * *

UNITED STATES PATENT AND TRADEMARK OFFICE
CERTIFICATE OF CORRECTION

PATENT NO.   : 6,434,601 B1  
DATED        : August 13, 2002  
INVENTOR(S)  : Rollins It is certified that error appears in the above-identified patent and that said Letters Patent is hereby corrected as shown below:

<u>Title page,</u>
Item [56], OTHER PUBLICATIONS, "Forwarding E-mail Between Accounts" should be -- <u>Forwarding E-mail Between Accounts</u> --;

<u>Column 2,</u>
Line 49, "modem-day" should be -- modern-day --;

<u>Column 8,</u>
Line 6, insert -- to said at least one intended recipient -- after "message";

Signed and Sealed this

Twenty-seventh Day of May, 2003

JAMES E. ROGAN
*Director of the United States Patent and Trademark Office*